(12) United States Patent  
Hirneise

(10) Patent No.: US 9,428,949 B2  
(45) Date of Patent: Aug. 30, 2016

(54) DOUBLE DOOR SYSTEM FOR PERSONAL VEHICLES

(71) Applicant: Paul Hirneise, Gainesville, FL (US)

(72) Inventor: Paul Hirneise, Gainesville, FL (US)

( * ) Notice: Subject to any disclaimer, the term of this patent is extended or adjusted under 35 U.S.C. 154(b) by 0 days.

(21) Appl. No.: 14/735,039

(22) Filed: Jun. 9, 2015

(65) Prior Publication Data

US 2016/0009164 A1     Jan. 14, 2016

Related U.S. Application Data

(63) Continuation-in-part of application No. 14/327,992, filed on Jul. 10, 2014, now Pat. No. 9,079,478.

(51) Int. Cl.
| | |
|---|---|
| *B60J 5/06* | (2006.01) |
| *E05D 15/08* | (2006.01) |
| *B60J 5/04* | (2006.01) |
| *E05D 15/06* | (2006.01) |

(52) U.S. Cl.
CPC .............. *E05D 15/08* (2013.01); *B60J 5/0487* (2013.01); *B60J 5/06* (2013.01); *E05D 15/0621* (2013.01)

(58) Field of Classification Search
CPC .................... E05Y 2900/531; E05Y 2900/55; B60J 10/79; B60J 5/0416; B60J 10/24; B60Q 1/2665; B60Q 2900/30; B60R 1/1207; B60R 2001/1284; B60R 21/12
USPC ........ 296/155, 191; 105/355, 378; 340/5.72; 160/201; 49/502
See application file for complete search history.

(56) References Cited

U.S. PATENT DOCUMENTS

| | | | | | |
|---|---|---|---|---|---|
| 1,930,547 | A | * | 10/1933 | Bales ..................... | E06B 3/5045 312/110 |
| 2,047,937 | A | * | 7/1936 | Bohn ...................... | A47F 3/043 312/295 |
| 2,074,870 | A | * | 3/1937 | Starr ....................... | A47F 3/043 312/116 |
| 2,192,519 | A | * | 3/1940 | King ....................... | A47F 3/043 312/139.2 |
| 2,198,436 | A | * | 4/1940 | Hoffman ................. | A47F 3/043 292/76 |
| 2,244,679 | A | * | 6/1941 | Derman .................. | A47B 61/06 217/62 |
| 2,408,460 | A | * | 10/1946 | Van Doren ............. | A47F 3/043 220/592.09 |
| 2,569,763 | A | * | 10/1951 | Hofferberth .......... | F25D 23/021 220/592.09 |
| 2,891,834 | A | * | 6/1959 | Lake ..................... | F25D 23/021 312/307 |

(Continued)

*Primary Examiner* — Kiran B Patel
(74) *Attorney, Agent, or Firm* — Sven W. Hanson

(57) ABSTRACT

A system of two door panels is defined with the panels arranged one above the other, each with independent horizontal movement operation. Each door panel is provided with a support and guide system that allows each to be moved horizontally into and away from an enclosure opening. The construction of the doors and supports enables attachment and operation on small lightweight vehicles in the nature of golf carts and similar vehicles. The construction details enable the panels to be secured onto to integrated into small light weight personal vehicles such as golf-carts and similar vehicles without substantially altering the vehicle's performance and operation.

4 Claims, 6 Drawing Sheets

(56) References Cited

U.S. PATENT DOCUMENTS

| | | | | | |
|---|---|---|---|---|---|
| 2,937,867 | A | * | 5/1960 | Schweig | B66B 13/06 318/760 |
| 2,941,856 | A | * | 6/1960 | Frick | A47B 31/02 126/333 |
| 3,169,810 | A | * | 2/1965 | Levy | A47F 9/00 108/108 |
| 3,177,989 | A | * | 4/1965 | Di Chiaro | F25D 23/021 49/421 |
| 3,327,616 | A | * | 6/1967 | Ozymy | A47J 37/041 126/25 A |
| 3,556,395 | A | * | 1/1971 | Herman | B65F 1/06 232/43.2 |
| 3,672,529 | A | * | 6/1972 | Feddersen | B65D 88/14 16/350 |
| 3,724,396 | A | * | 4/1973 | Roth | B61D 23/02 105/378 |
| 3,795,205 | A | * | 3/1974 | Gritchen | B61D 23/025 105/443 |
| 4,068,407 | A | * | 1/1978 | Podolan | E05D 15/1081 49/215 |
| 4,381,876 | A | * | 5/1983 | Fenwick | A47F 3/00 312/111 |
| 4,421,355 | A | * | 12/1983 | Marcus | B60J 3/0282 296/97.5 |
| 4,606,146 | A | * | 8/1986 | Jozefozak | E05D 15/1081 49/216 |
| 4,705,187 | A | * | 11/1987 | Linn | B23Q 11/0021 220/819 |
| 4,932,715 | A | * | 6/1990 | Kramer | B60J 5/06 296/155 |
| 5,129,677 | A | * | 7/1992 | Marshall | B60J 11/00 150/166 |
| 5,239,933 | A | * | 8/1993 | Murphy | B60P 3/08 105/374 |
| 5,465,531 | A | * | 11/1995 | Herrmeyer | B60J 1/16 49/413 |
| 5,893,236 | A | * | 4/1999 | Krbec | B61D 19/008 49/118 |
| 6,539,669 | B1 | * | 4/2003 | Heidrich | B61D 19/008 16/87 R |
| 7,779,761 | B2 | * | 8/2010 | Barry | B60K 1/00 104/20 |
| 2002/0000735 | A1 | * | 1/2002 | Sturgin | B60J 5/14 296/50 |
| 2003/0218358 | A1 | * | 11/2003 | Hahn | B60J 5/047 296/155 |
| 2004/0010973 | A1 | * | 1/2004 | Lio | E06B 7/20 49/306 |
| 2004/0216383 | A1 | * | 11/2004 | Rogers, Jr. | E05B 85/26 49/360 |
| 2005/0116496 | A1 | * | 6/2005 | Lowson | B60J 5/062 296/146.11 |
| 2006/0197357 | A1 | * | 9/2006 | Catania | B60J 5/06 296/155 |
| 2007/0062122 | A1 | * | 3/2007 | Polus | E05D 15/0669 49/425 |
| 2008/0156201 | A1 | * | 7/2008 | Cook | A21B 1/44 99/443 R |
| 2008/0253857 | A1 | * | 10/2008 | McJunkin | B60P 7/14 410/132 |
| 2009/0100999 | A1 | * | 4/2009 | Marqueling | F41H 5/16 89/36.08 |
| 2009/0230724 | A1 | * | 9/2009 | Fischer | B60J 5/06 296/155 |
| 2009/0243332 | A1 | * | 10/2009 | Skierkiewicz | B60J 5/062 296/146.2 |
| 2009/0315362 | A1 | * | 12/2009 | Michnik | B60J 5/06 296/155 |
| 2010/0281931 | A1 | * | 11/2010 | Slager | E05B 65/0882 70/78 |
| 2011/0001330 | A1 | * | 1/2011 | Hirneise | B60J 5/065 296/77.1 |
| 2011/0001331 | A1 | * | 1/2011 | Hirneise | B60J 1/06 296/87 |
| 2012/0187716 | A1 | * | 7/2012 | Domlovil | B62D 25/02 296/155 |
| 2013/0019625 | A1 | * | 1/2013 | Bryce | A47F 3/0408 62/251 |
| 2013/0263512 | A1 | * | 10/2013 | Hus | G09F 21/04 49/70 |
| 2013/0292955 | A1 | * | 11/2013 | Higgins | B60Q 9/00 292/195 |
| 2014/0026881 | A1 | * | 1/2014 | Abrams | A47J 37/0713 126/25 R |
| 2014/0130705 | A1 | * | 5/2014 | Zona | B61D 19/005 105/397 |

* cited by examiner

DOUBLE DOOR SYSTEM FOR PERSONAL VEHICLES

BACKGROUND

The present invention pertains to doors for personal vehicles, particular doors having multiple movable panels. Particularly in very small personal vehicles such as golf carts and similar vehicles used for travel away from controlled streets and highways, the design of the personal enclosure and doors is critical. This is because low weight and simplicity are important due to vehicle power limitations and the loss of performance with increase weight and other factors. For these reasons, such small personal vehicles often are not provided with enclosures at all, or may include an enclosure form primarily of flexible fabric-like materials, such as plastics, water-proof woven fabric and the like.

However, there is a demand for enclosures for such vehicles that provide more environmental protection. There are design difficulties in including enclosure doors on many of these vehicles. One is the inherent lack of supporting structure available in the base frame elements of the vehicles and the desire to minimize weight. What is needed is an enclosure door system that is easily adapted to the design of existing small personal vehicles.

SUMMARY OF THE INVENTION

The invention is a system of two door panels, arranged one above the other, each with independent horizontal movement operation. Each door panel is provided with a support and guide system that allows each to be moved horizontally into and away from an enclosure opening. The construction of the doors and supports enables attachment and operation on small lightweight vehicles in the nature of golf carts and similar vehicles. The construction details enable the panels to be secured onto to integrated into small light weight personal vehicles such as golf-carts and similar vehicles without substantially altering the vehicle's performance and operation.

In a preferred embodiment, the support and guide system has the form of horizontal tracks that are secured to, or integral with, the outer body elements of a vehicle. Mating elements on the door panels allow the door panels to be supported and guided by the tracks as the panels are moved in a common vertical plane in operation. Each panel is independent supported to allow independent operation of each to enable multiple combinations of opening configurations to satisfy different user needs.

Other novel aspects and benefits of the invention are defined in the following description of embodiments of the invention and the accompanying figures although the scope of the invention is not intended to be limited by them.

DETAILS OF EMBODIMENTS OF THE INVENTION

Figure 1:
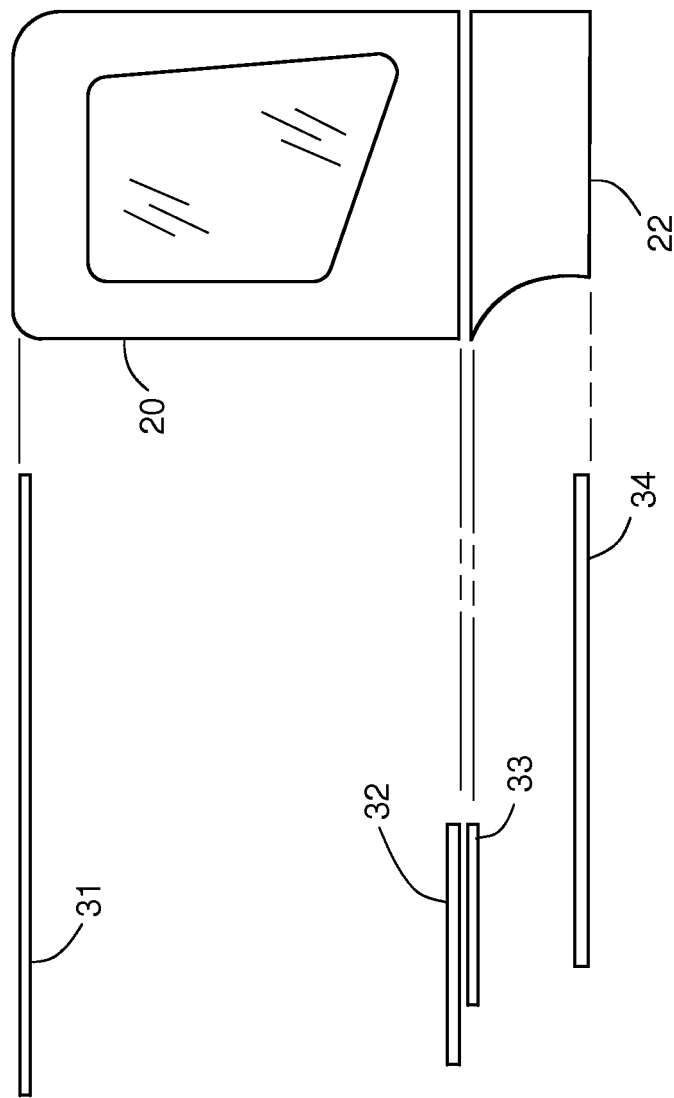
FIG. 1 is a side view of the inventive door system separated from the supporting vehicle supporting structure.

FIGS. 1 to 6 regard a common embodiment of the invention and the following discussion pertains to the elements of all the figures. FIG. 1 illustrates the principal components of the inventive door system. An upper door panel 20 is generally located above a lower door panel 22 in a common vertical plane. The two panels are shown for illustration purposes separated from supporting tracks 31, 32, 33, 34. For clarity, all the components are illustrated as separated from the supporting structure and associated vehicle.

FIG. 1 illustrates the principal components of one configuration of the invention. The door panels 20, 22 are shown separated from the tracks 31, 32, 33, 34 for clarity. The associated vehicle structures are not illustrated. The first upper track 31 and first lower track 32 are spaced and aligned to support and operate the upper panel 20. The second upper track 33 and second lower track 34 are similarly spaced and aligned for the lower panel 22.

Figure 2:
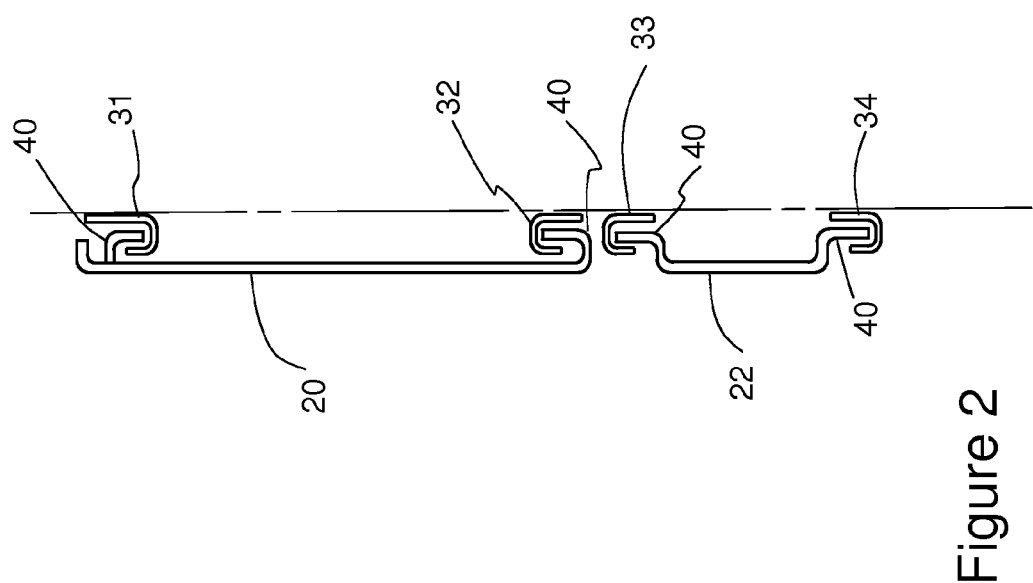
FIG. 2 is a section view of the door system components.

FIG. 2 is a cross-section view of the door panels 20, 22 and associated tracks 31, 32, 33, 34 to illustrate their relative orientations. The upper panel 20 includes an upper and lower track hanger 40. Each hanger 40 is configured and located on the back side of the panel 20 to engage with respective track 31, 32. Each hanger 40 may consist of one or more distinct elements aligned horizontally and permanently secured to the panel 20. The tracks 31-34 and hangers 40 provide for lateral movement of the panels 20, 22 without rotation of the panels.

FIGS. 3, 4, 5 and 6 illustrate various conditions in use of a door system according to the invention on a conventional personal vehicle 99. On one side portion of the vehicle 99 track elements 31, 32, 33, 34 are permanently secured to support and operate door panels 20, 22 as part of a vehicle enclosure system. Preferably, the track elements 31, 32, 33, 34 and the door panels 20, 22 are coordinated with other structures of the enclosure system to provide an effective environmental separation to protect a vehicle operator within the enclosure from surrounding ambient conditions such as cold, rain or wind.

Figure 6:
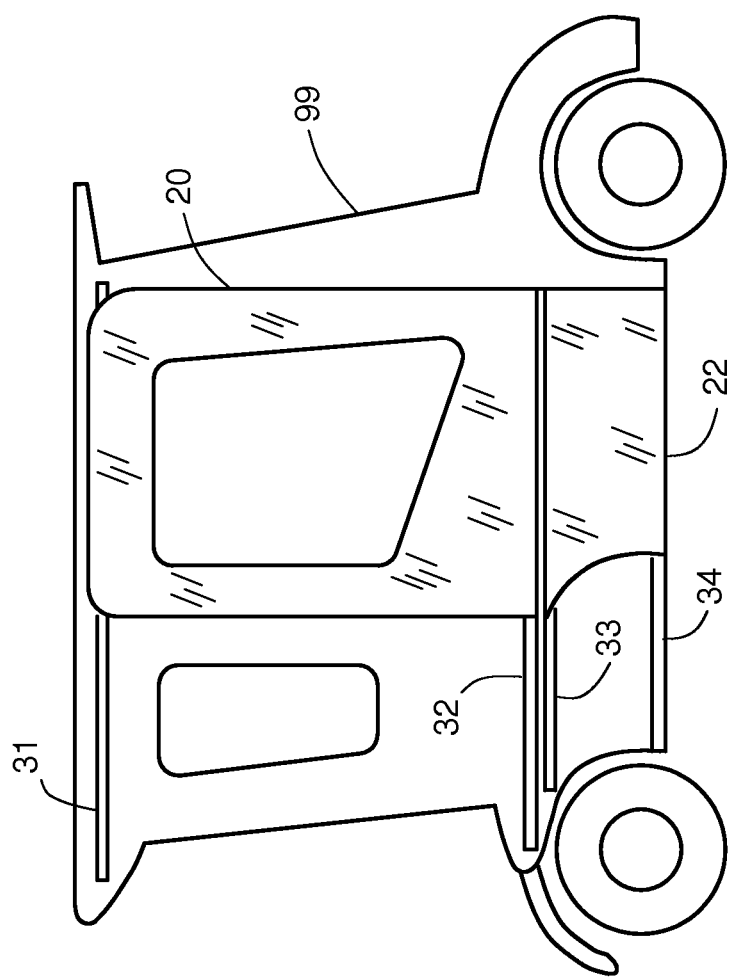

The track elements 31, 32, 33, 34 should be horizontal or provide horizontal movement operation of the door panels. The first upper track 31 is configured and located to extend over the side opening of the vehicle to allow the upper panel 20 to be moved into a position to block the side opening, or alternatively, be moved away to provide access by a user through the opening. The second lower track 34 track is located to extend below the side opening to similarly allow the lower panel to be moved, alternatively, to block or provide access to the side opening. In FIG. 6, both door panels 20, 22 are shown positioned in a closed condition, effectively blocking the vehicle side opening.

The first lower track 32 and second upper track 33 elements are arranged closely spaced, vertically, to allow the upper panel 20 and lower panel 22 to be closely spaced with a minimal intervening gap. It may be possible and beneficial to provide contacting weather-stripping on one or both of the respecting mating surfaces of the two panels 20, 22 to provide a maximum of a physical barrier. It should be obvious that the first lower track 32 and the second upper track 33 elements may be integrated into a single structure for convenience of manufacture and assembly.

Figure 4:
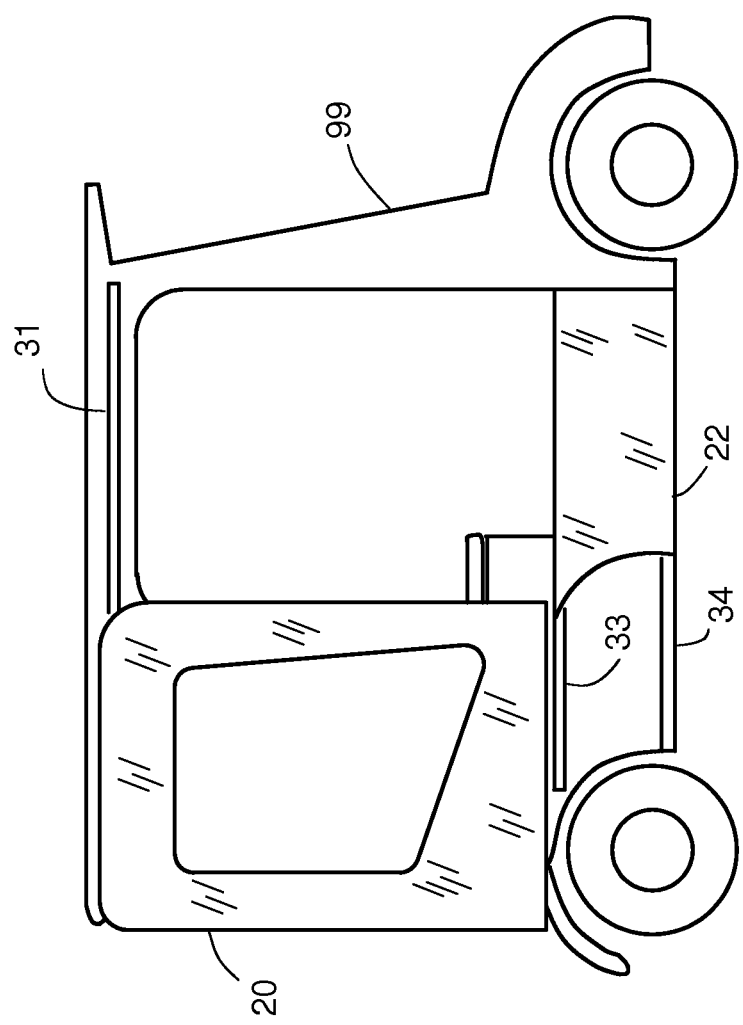

In FIG. 4, the upper panel 20 has been moved to be positioned rearward on the vehicle to enable user access to a vehicle side opening. At the same time, the lower panel 22, being independent in operation, may remain in place, as shown, blocking the side opening at the lever of the vehicle flooring and immediately above. In this manner, the lower panel 22 may function to contain objects or pets placed by the user within the vehicle on the vehicle's floor. For this reason, the lower panel 22 should be located and operated as closely as possible to the vehicle structure at the flooring level to create as continuous a barrier as possible.

Figure 5:
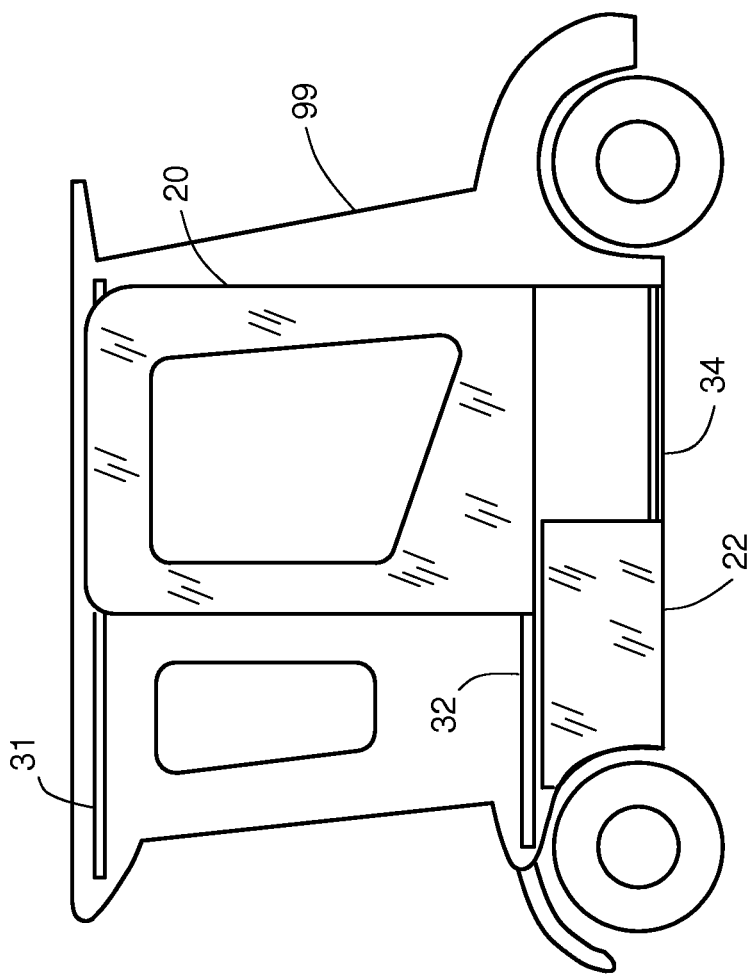

In FIG. 5, the upper panel 20 is in the forward most position, blocking the vehicle side opening, while the lower panel 22 is rearward to allow a lower portion of the vehicle side opening to be open. This configuration of use may be useful for allowing air movement while preventing substantial entry of rain. For this purpose, the lower panel 22 has a vertical height dimension PD in the range of 9 to 18 inches. This vertical height is also limited by the combination of the vehicle seating and the limitation of the rearward movement of the lower panel 22. A taller lower panel 22 would not be capable of being cleared (by sliding rearward) from blocking the side opening of the vehicle. However, a lower panel 22 of reduced height, with a vertical height dimension PD in the range of 4 to 9 inches may also be used to effect a similar result. While this reduced height may not be as effective in containing physical objects in the vehicle, as is preferably desired, such a dimension will provide for a beneficial level of air movement without rain intrusion as is also desired. In all cases, the lower panel 22 height dimension PD, and corresponding greater upper panel vertical dimension PDU, provides the essential function described.

Because the vehicle body panels are conventionally often narrower at the level of the floor, and the vehicle wheels often extend outward from the plane of the vertical vehicle body panels, it may be necessary to conform the lower panel 22 perimeter to the limits of the vehicle body panels adjacent the rear wheels. This vehicle geometry is also a necessitating factor in the dual panel configuration of the invention. Because the narrow lower regions of the vehicle body provide a very limited horizontal range of support for the panels, this range also limits the range of movement and therefore the size of the side opening provided when the panels are moved rearward. This is not a significant issue at foot level, but where a user's torso must pass through the side opening (in the upper regions), it is essential that the side opening be wider. As a consequence, the upper panel 20 must have a greater range of movement than might be provided by the vehicle dimensions at the vehicle floor level. As can be seen, this problem is resolved by providing upper panel supporting tracks 31, 32 at a location above the wheels where a longer horizontal dimension exists on the vehicle. Because the lower panel 22 is blocked from the same rearward movement by vehicle wheels, it is supported independently.

Figure 3:
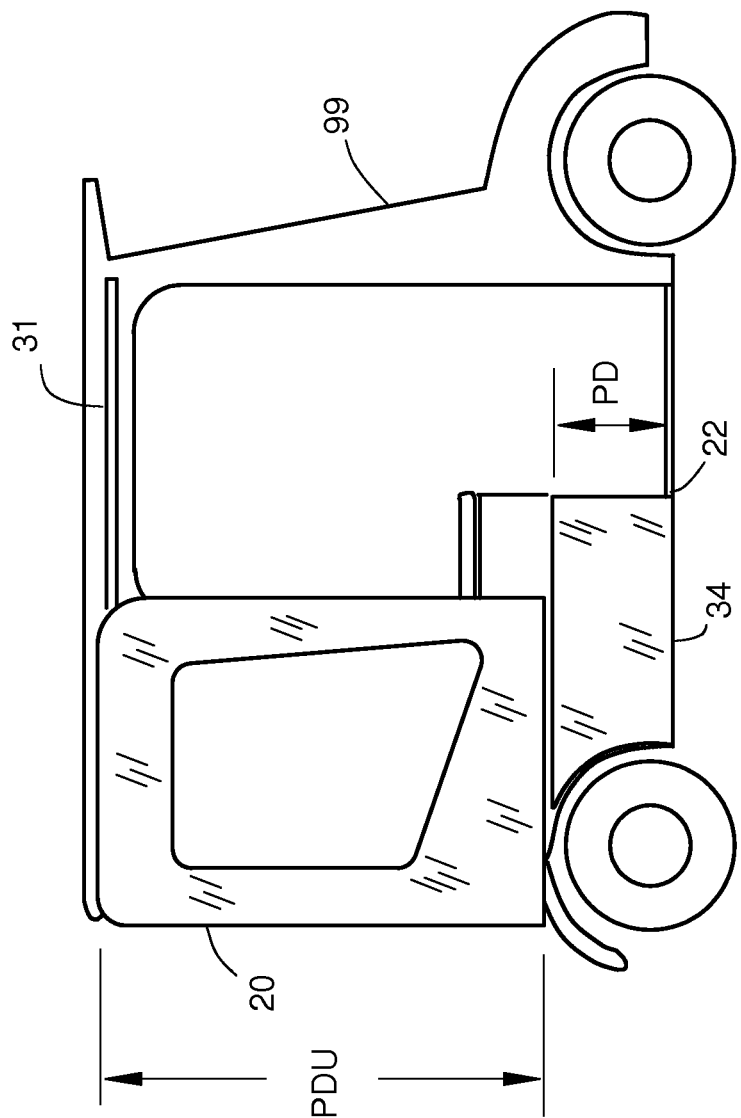
FIGS. 3, 4, 5, and 6 are side views of a personal vehicle including the inventive door system in four operational configurations.

In FIG. 3, both door panels 20, 22 are positioned at a maximum location rearward on the respective track elements 31 to 34 to expose the vehicle side opening. It is important that the track elements 31 to 34 extend sufficiently rearward on the vehicle structure to maintain a stable support to both door panels when they are fully retracted in this manner. At the same time, stable support when the door elements are positioned fully forward (FIG. 6) is also required. It should be noted that the upper panel 20 moves to a more rearward location than, and extends beyond, the lower panel 22. The lower panel 22 rearward movement is limited by the presence of the rear wheels of the vehicle, while the upper panel movement is not so limited. By allowing the upper panel 20 to be moved beyond the range of the lower panel 22, the vehicle side opening is maximized to allow easy access by users. This requires appropriate placement of the upper panel hangers on the upper panel 20.

The track elements 31-34 each may have a cross-section shape of a simple "J" shaped channel as illustrated, or may include aspects to enable more secured attachment of the door panels or provide other functional aspects such as adjustment. The cross-section shape shown is one of various alternatives contemplated. Likewise, the mating door track hangers 40 may have other shape: in all cases mating with that of the track elements 31, 32, 33, 34.

The essential function of the track elements 31, 32, 33, 34 is to provide a continuous horizontal bearing surface that allows easy sliding operation of the door elements placed in contact with the track elements - while capturing the door panels 20, 22 in proper position. The hanger 40 bear directly on the surface of the respective track without rollers or other mechanical friction-reducing devices. Preferably, a liner material is used within the track elements to both reduce sliding friction and make a more stable and conforming fit between the hanger and its track. The liner material may take the form of one element of a fabric "hook and loop" fastener material such as that sold under the VELCRO trademark (registered trademark of Velcro Industries B.V.).

To maintain sufficient rigidity, it is suggested that the perimeter edge portions of the upper door panel 20 extend perpendicularly from the main portions, in a skirt element, or the equivalent, to provide an increased bending resisting section.

The lower panel 22 is formed such that a perimeter portion at the top and bottom edges are offset to enable them to enter and engage the associated tracks 33, 34 (FIG. 2). In this configuration, the weight of the lower panel 22 is supported by the lower track 34, while the upper track 33 provided stability and retains the lower panel 22 in place.

The upper panel 20 and lower panel 22 are each preferably formed of high density thermoplastic such as a sheet material that is substantially acrylonitrile butadiene styrene (ABS) or the like. Preferably, sheet ABS material having a thickness in the range of 1/8 inch to 3/16 inch. The ABS material in this thickness range is sufficiently tough and has a low friction coefficient in sliding so that the edge surface of the ABS material may be used as a bearing surface, without rollers or other friction-reducing devices, for the configuration panels considered in the invention.

For typical personal vehicles considered here, the upper door panel size and weight are limited and this enables the simple tracking and support system due to limited forces involved. Typically, an upper door panel 20 will consist of no more than about 16 square feet and have a resulting weight under 18 to 20 pounds including all fittings and trim. Consequently, this design is not suggested for larger vehicles having larger doorway and opening dimensions where weight and rigidity would require greater support and tracking abilities.

Other novel aspects of the invention will be clear from the above description and accompanying drawing figures and below claims. Other modes and constructions are contemplated to carry out the invention.

The invention claimed is:

1. A novel vehicle enclosure door system comprising:
   a rigid upper door panel and a rigid lower door panel, the upper panel and lower panel each having a respective overall vertical dimension;
   a track system configured to support both panels on the side of a vehicle while enabling the independent horizontal movement of each panel in a common vertical plane; and
   the lower panel vertical dimension being less than the upper panel vertical dimension.

2. A door system, according to claim 1 and wherein:
   the lower panel vertical dimension is in the range of 4 to 18 inches.

3. A door system, according to claim 2, and further comprising:
   a personal vehicle having a side user egress opening, and wherein:
   the track system is secured to the personal vehicle;
   such that the upper and lower panels alternatively, or in combination, block the side user egress opening.

4. On a personal vehicle having a side user egress opening, an improvement comprising:
   a rigid upper door panel and a rigid lower door panel, together configured to close the vehicle side opening in a first condition;
   the lower door panel having an overall vertical dimension in the range of 4 to 18 inches;
   a track system secured to the vehicle and configured to retain both panels; and
   the track system and panels configured to allow independent rearward movement of each panel from the first condition to respective second positions unblocking the side opening.

\* \* \* \* \*